United States Patent
Hsu et al.

(10) Patent No.: US 10,837,754 B2
(45) Date of Patent: Nov. 17, 2020

(54) WIRELESS PASSIVE STRAIN SENSOR HAVING OUTER AND INNER COIL HOLDERS

(71) Applicant: NATIONAL CHIAO TUNG UNIVERSITY, Hsinchu (TW)

(72) Inventors: Wen-Syang Hsu, Hsinchu (TW); Sung-Yueh Wu, Chiayi County (TW); Cheng Tu, Taipei (TW); Chia-Min Chao, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 9 days.

(21) Appl. No.: 16/266,589

(22) Filed: Feb. 4, 2019

(65) Prior Publication Data

US 2019/0301847 A1 Oct. 3, 2019

(30) Foreign Application Priority Data

Mar. 27, 2018 (TW) .............................. 107110564 A

(51) Int. Cl.
*G01B 7/24* (2006.01)
*F16C 41/00* (2006.01)
*G01B 7/16* (2006.01)

(52) U.S. Cl.
CPC .............. *G01B 7/22* (2013.01); *F16C 41/00* (2013.01); *G01B 7/24* (2013.01); *F16C 2233/00* (2013.01); *G01B 2210/58* (2013.01)

(58) Field of Classification Search
None
See application file for complete search history.

(56) References Cited

U.S. PATENT DOCUMENTS

| | | | |
|---|---|---|---|
| 4,825,701 A * | 5/1989 | Holtslander | G01B 7/16 73/782 |
| 4,941,363 A * | 7/1990 | Doemens | G01L 3/106 361/290 |
| 6,532,824 B1 * | 3/2003 | Ueno | G01L 1/142 73/780 |
| 6,601,462 B1 * | 8/2003 | Ueno | G01M 3/103 73/862.337 |
| 9,989,088 B2 * | 6/2018 | Reveles | F16C 29/002 |
| 10,161,956 B2 * | 12/2018 | Dwyer | G01P 15/125 |
| 10,180,445 B2 * | 1/2019 | Dwyer | G01P 15/125 |
| 2013/0165801 A1 * | 6/2013 | Min | A61B 5/0215 600/486 |

* cited by examiner

*Primary Examiner* — Natalie Huls
*Assistant Examiner* — Jermaine L Jenkins
(74) *Attorney, Agent, or Firm* — Muncy, Geissler, Olds & Lowe, P.C.

(57) ABSTRACT

A wireless passive strain sensor is provided. The wireless passive strain sensor includes an outer coil holder, a reading inductance coil, a capacitance patch, an inner coil holder, and a sensing inductance coil. A shaft penetrates through the outer coil holder. The reading inductance coil is disposed on the outer coil holder. The capacitance patch is disposed on the shaft. The inner coil holder is disposed inside the outer coil holder. The inner coil holder is disposed on the shaft. The sensing inductance coil is disposed on the inner coil holder. The sensing inductance coil is electrically connected to the capacitance patch.

9 Claims, 4 Drawing Sheets

WIRELESS PASSIVE STRAIN SENSOR HAVING OUTER AND INNER COIL HOLDERS

CROSS-REFERENCE TO RELATED APPLICATION

This application claims the benefit of Taiwan Patent Application No. 107110564, filed on Mar. 27, 2018, in the Taiwan Intellectual Property Office, the disclosure of which is incorporated herein in its entirety by reference.

BACKGROUND OF THE INVENTION

1. Field of the Invention

The present invention generally relates to a strain sensor, and more particularly to a wireless passive strain sensor able to sense a strain of a shaft.

2. Description of the Related Art

Generally, to measure the load on a dynamic rotating shaft, a sensor is usually mounted on the shaft. However, mounting the sensor on the shaft requires a battery or a wireless transmission module, which occupies more spaces, makes connecting lines entangle the shaft when rotating, or requires machining the shaft. The methods mentioned above would affect the shaft when rotating due to the existence of the sensor, further affecting the results of the measurement.

SUMMARY OF THE INVENTION

In view of the above-mentioned problems, the present invention provides a wireless passive strain sensor to solve the problems encountered in conventional techniques.

Based on the purpose stated above, the present invention provides a wireless passive strain sensor applicable to measure a strain of a shaft. The wireless passive strain sensor includes an outer coil holder, a reading inductance coil, a capacitance patch, inner coil holder, and a sensing inductance coil. The shaft penetrates through the outer coil holder. The reading inductance coil is wrapped on the outer coil holder. The capacitance patch is disposed on the shaft. The inner coil holder is disposed in the outer coil holder and mounted on the shaft. The sensing inductance coil is wrapped around the inner coil holder and is electrically connected to the capacitance patch.

Preferably, the reading inductance coil is electrically connected to an antenna analyzer.

Preferably, the antenna analyzer is configured to scan a resonance frequency of the reading inductance coil corresponding to the sensing inductance coil.

Preferably, the antenna analyzer is electrically connected to a computer configured to receive the resonance frequency, generate a resonance frequency result according to the resonance frequency, and display the resonance frequency result.

Preferably, a bearing structure is disposed between the outer coil holder and the inner coil holder.

Preferably, the bearing structure includes a plurality of ball bearings.

Preferably, the ball bearings are polyoxymethylene (POM) plastic bearings.

Preferably, the capacitance patch is an interdigital capacitor, one end of which is electrically connected to one end of the sensing inductance coil, and the other end of which is electrically connected to the other end of the sensing inductance coil.

Preferably, the capacitance patch is a flexible patch.

Preferably, an included angle between the capacitance patch and the axis of the shaft is 45°.

In view of the statements above, the wireless passive strain sensor in the present invention includes the following advantages:

1. Wireless transmission: The reading inductance coil is supported by the outer coil holder, so the rotating shaft can still be measured without being tangled.
2. Space efficiency: The sensing part is constituted by the sensing inductance coil and the inner coil holder. Therefore, disposing a battery module is unnecessary, thereby effectively reducing the occupied space.
3. Ease of operation: Complicated operations, such as replacing the battery module and/or detaching the shaft, can be omitted.
4. Shaft machining unnecessary: it is not necessary to lengthen the shaft, or change material or shape of the shaft for measurement.
5. A flexible patch: The patch can be attached to an object with a moderately curved surface.
6. Instantaneous measurement

BRIEF DESCRIPTION OF THE DRAWINGS

The structure, operating principles, and effects of the present invention are described in detail by means of various embodiments illustrated together with the drawings.

DETAILED DESCRIPTION OF THE PREFERRED EMBODIMENTS

To facilitate the review of the technique characteristics, contents, advantages, and achievable effects of the present invention, the embodiments together with the drawings are described in detail as follows. However, the drawings are used only for the purpose of indicating and supporting the specification, which is not necessarily the real proportion and precise configuration after the implementation of the present invention. Therefore, the relations of the proportion and configuration of the attached drawings should not be interpreted to limit the actual scope of implementation of the present invention.

Figure 1:
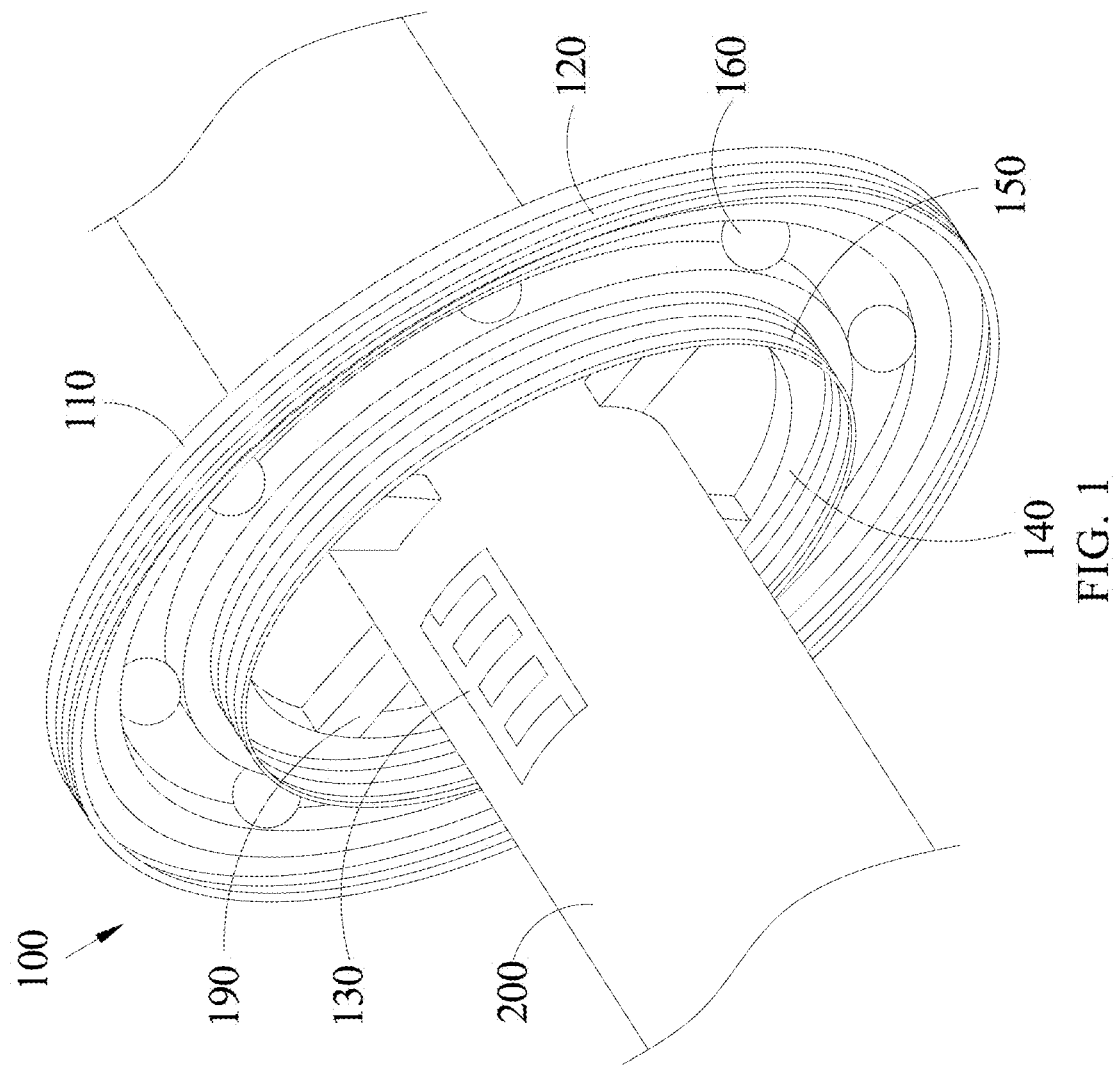
FIG. 1 is a first schematic view of a wireless passive strain sensor of an embodiment in the present invention.
Figure 2:
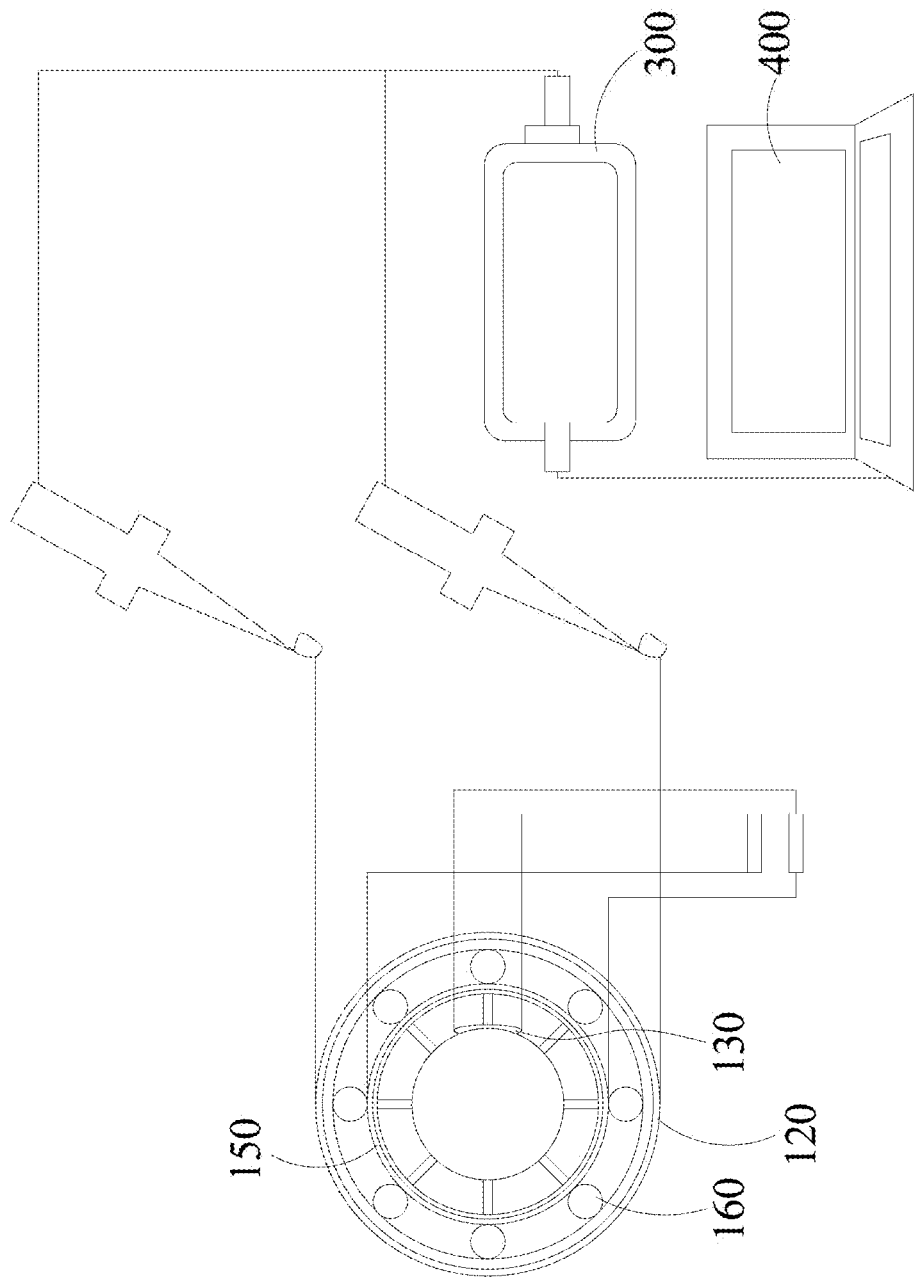
FIG. 2 is a second schematic view of a wireless passive strain sensor of an embodiment in the present invention.
Figure 3:
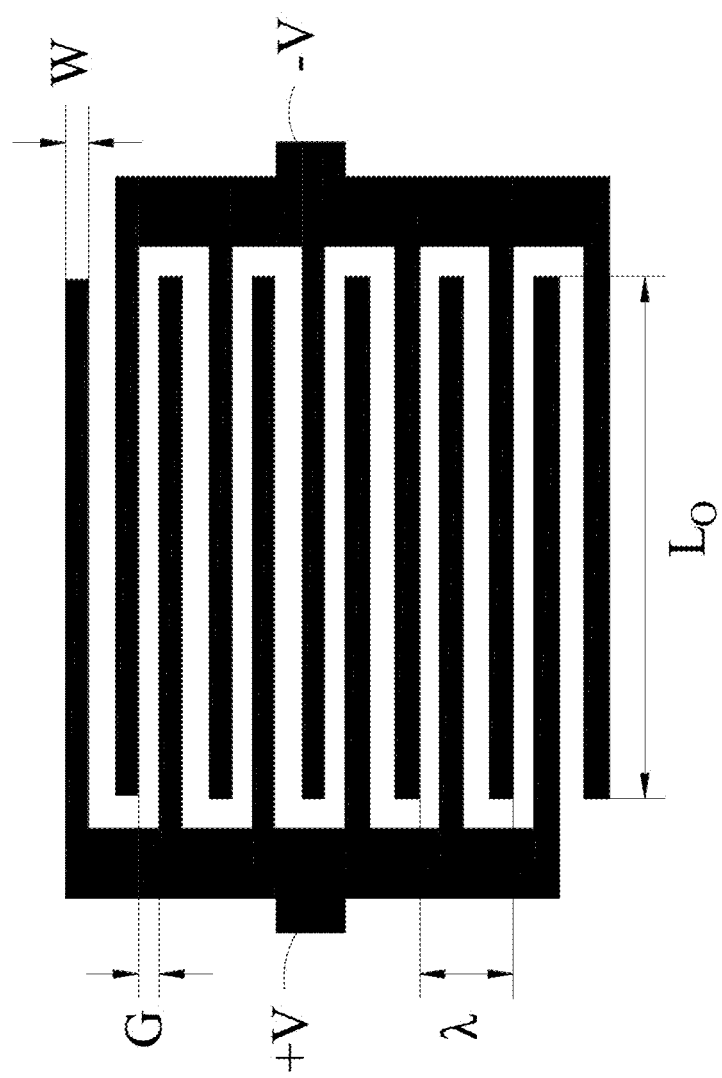
FIG. 3 is a first schematic view of a capacitance patch of a wireless passive strain sensor of an embodiment in the present invention.
Figure 4:
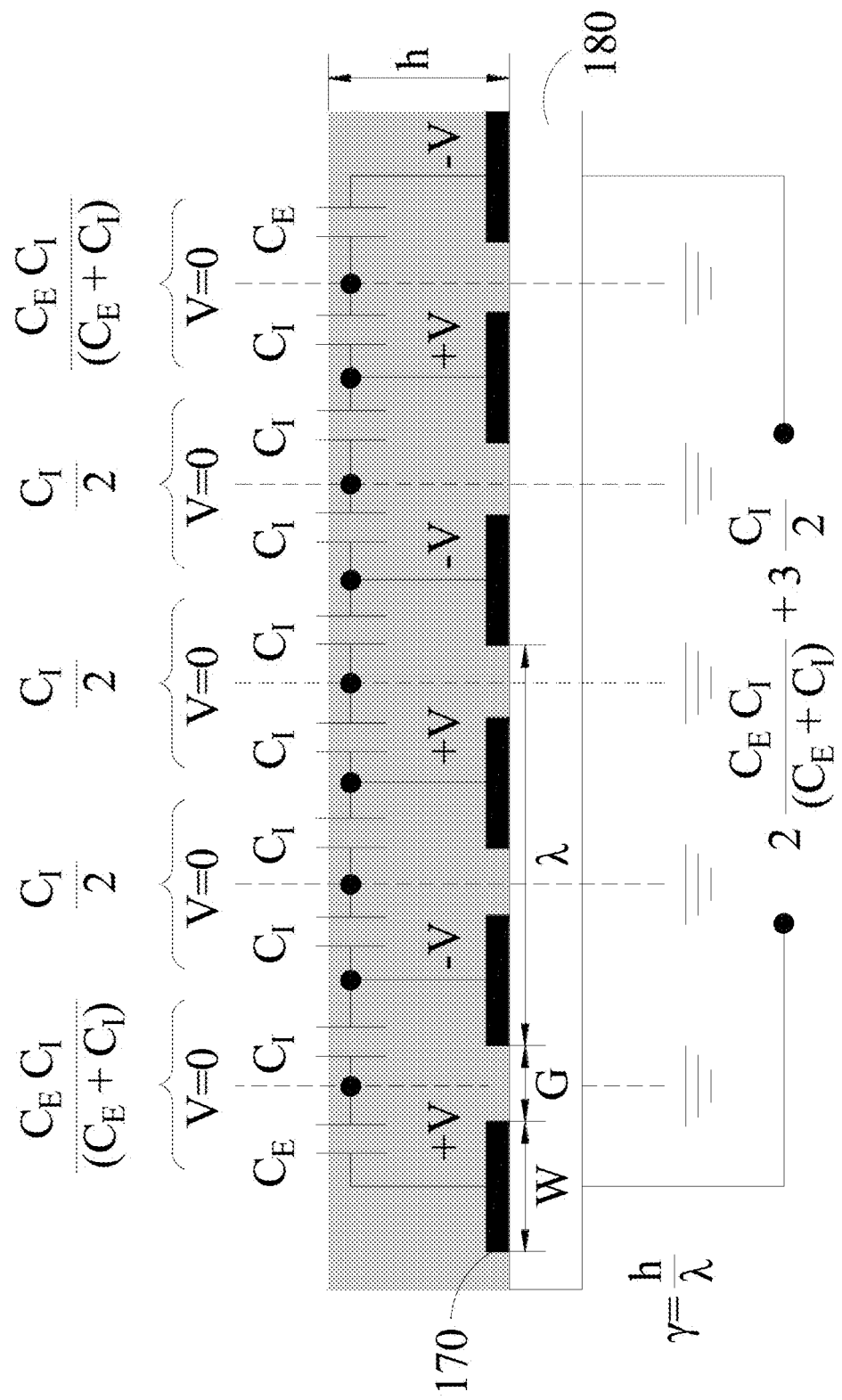
FIG. 4 is a second schematic view of a capacitance patch of a wireless passive strain sensor of an embodiment in the present invention.

Please refer to FIGS. 1 to 4. FIG. 1 is a first schematic view of a wireless passive strain sensor of an embodiment in the present invention. FIG. 2 is a second schematic view of a wireless passive strain sensor of an embodiment in the present invention. FIG. 3 is a first schematic view of a capacitance patch of a wireless passive strain sensor of an embodiment in the present invention. FIG. 4 is a second schematic view of a capacitance patch of a wireless passive strain sensor of an embodiment in the present invention. As shown, a wireless passive strain sensor 100 is applicable to measure the strain of a shaft 200. A wireless passive strain sensor 100 includes an outer coil holder 110, a reading inductance coil 120, a capacitance patch 130, an inner coil holder 140, and a sensing inductance coil 150.

The shaft 200 penetrates through the outer coil holder 110 without making a connection. The reading inductance coil 120 is wrapped around the outer coil holder 110.

The capacitance patch 130 is attached to the shaft 200.

The inner coil holder 140 is disposed inside the outer coil holder 110 without making connection, and the inner coil holder 140 is mounted on the shaft 200. The sensing inductance coil 150 is wrapped around the inner coil holder 140, and the sensing inductance coil 150 is electrically connected to the capacitance patch 130.

To be more specific, the wireless passive strain sensor 100 in the present invention is an inductance-capacitance-loop strain sensor. The principle of operation is that the resonance frequency of the circuit changes after the inductance-capacitance loop becomes strained. The change of the resonance frequency can be obtained by the deformation of the capacitance patch 130 due to the rotation of the shaft 200. The capacitance patch 130 is electrically connected to the sensing inductance coil 150. Then, the sensing inductance coil 150 and the reading inductance coil 120 conduct wireless transmission.

Wherein, the configuration of the sensing inductance coil 150, the reading inductance coil 120, and the capacitance patch 130 is described below:

The sensing part unity constituted by the inner coil holder 140 and sensing inductance coil 150 is assembled on the shaft 200. Electrodes are made on a flexible substrate 180 to form the capacitance patch 130 that is further attached to a surface of the shaft 200. The sensing inductance coil 150 is wrapped on the inner coil holder 140 in a spiral manner, and electrically connected to the capacitance patch 130, so as to form the inductance-capacitance loop. The outer coil holder 110 does not make any contact with the shaft 200, but can be connected to an outer shell provided with the shaft 200 body; however, the present invention is not limited thereto. A diameter slightly larger than the shaft 200 surrounds the inner coil holder 140. The reading inductance coil 120 wrapped on the outer coil holder 110 in a spiral manner performs wireless reading with the sense inductor 150 to constitute a wireless transmission module.

A connecting holder 190 connects the shaft 200 with the inner coil holder 140. Because the torque makes the strain of the surface of the shaft 200 become small, the connecting holder 190 may absorb a part of the strain transmitted by the shaft 200 and further make the strain of the sensing inductance coil 150 extremely low. On the other hand, after the capacitance patch 130 is properly designed, the variation of the capacitance may be much larger than that of the inductance. Therefore, the variation of the inductance caused by the deformation of the inner coil may be neglected.

Wherein, when the shaft 200 is a metal shaft, it may interfere with the result obtained from the sensing inductance coil 150. For this reason, the sensing inductance coil 150 is wrapped around the inner coil holder 140 closely fitted with the shaft 200. With expanding the distance between the sensing inductance coil 150 and the shaft 200 by the inner coil holder 140, the purpose of preventing interference can be achieved.

Moreover, the reading inductance coil 120 can be electrically connected to the antenna analyzer 300. The antenna analyzer can be a portable device. Furthermore, the antenna analyzer 300 can scan the resonance frequency of the sensing inductance coil 150 wirelessly read by the reading inductance coil 120. To be more specific, the antenna analyzer 300 can be electrically connected to the computer 400. The computer 400 can receive the resonance frequency, generate the resonance frequency result according to the resonance frequency, and display the resonance frequency result.

In addition, a bearing structure can be disposed between the outer coil holder 110 and the inner coil holder 140. Specifically, the bearing structure can include a plurality of ball bearings 160. Wherein, the ball bearings 160 can be polyoxymethylene plastic bearings.

When installing the wireless passive strain sensor 100, the ball bearings 160 are used to fix the distance between the center of the sensing inductance coil 150 and that of the reading inductance coil 120 to prevent eccentricity of the sensing inductance coil 150 and the reading inductance coil 120. It is preferred that the ball bearings are in a 6805-type size (the internal diameter is 25 mm, and the outer diameter is 37 mm) so that they can closely be fitted with the inner coil holder 140 and the outer coil holder 110. The metal material mentioned above may affect signal transmission performance, so the outer ring of the bearing structure and the inner ball bearing 160 materials are made of polyoxymethylene (POM) plastic, a hard plastic material capable of best withstanding lateral loads. The highest rotational speed this material can withstand is 980 rpm. The measurement platform for scanning and displaying the resonance frequency can be electrically connected to the reading inductance coil 120 by Dupont line. The antenna analyzer 300 is electrically connected to the Dupont line to scan the resonance frequency. Finally, the resonance frequency sensing result is displayed through the connection to the computer 400.

The capacitance patch 130 can be an interdigital capacitor. One end of the interdigital capacitor can be connected to one end of the sensing inductance coil 150, and the other end of the interdigital capacitor can be connected to other end of the sensing inductance coil 150. Wherein, the capacitance patch 130 can be a flexible patch, and an included angle between the capacitance patch 130 and the axis of the shaft 200 can be 45°.

Wherein, the interdigital capacitor is designed based on a theoretical model proposed by Rui Igreja and C. J. Dias in 2004. Please refer to FIG. 3, which shows a plane view of a geometrical design of the electrodes, wherein W is a width of the electrode, G is an interval between electrodes, and $L_o$ is a length of the electrodes overlapping each other, and the positive electrode and the negative electrode are the connecting parts respectively connected to +V/−V. According to the sectional view of the interdigital capacitor shown in FIG. 3, this design is provided under the condition that the width of the electrode is far larger than the thickness of the electrode. Therefore, there is no need to consider the effect of the thickness of the electrode. Moreover, because this design is a periodic structure, the length λ can be introduced as a periodic structural length. The area ratio of the electrodes can be used to calculate a metallization ratio η, with equations (1) and (2) shown as follows:

$$\lambda = 2(W+G) \tag{1}$$

$$\eta = \frac{W}{W+G} = \frac{2W}{\lambda} \tag{2}$$

Zero potential exists between the positive and negative electrodes 170, and the zero potential is particularly formed at a central position (see the dashed lines shown in FIG. 4) between the two electrodes 170 due to the periodic and symmetrical structure. According to the characteristics, an equivalent circuit model of the interdigital capacitor can be derived as shown in FIG. 4, wherein $C_E$ and $C_I$ are outer equivalent capacitance and inner equivalent capacitance respectively, and the total capacitance value of the interdigital capacitor can be calculated according to equation (3) below:

$$C = 2\frac{C_E C_I}{(C_E + C_I)} + (N-3)\frac{C_I}{2}, N \geq 3 \qquad (3)$$

wherein N, an even number higher than 3, is the number of electrodes in total.

As a result, the total capacitance value can be calculated according to a series of conformal mapping technologies and complements. The parameter r, shown as h/λ, is a geometrical ratio parameter of the cross-section of an electrode (h is a medium thickness between the electrodes), which may affect the outer equivalent capacitance and the inner equivalent capacitance. In calculation for the final capacitance value, it is imperative to consider the effect of using the multilayer materials on the capacitance value. The material at the left side can be divided into air (dielectric constant $\varepsilon_{air}=1$), the first medium (the dielectric constant is $\varepsilon_1$), and the second medium (the dielectric constant is $\varepsilon_2$). The thicknesses of these media are $h_{air=\infty}$, $h_1$, and $h_2$ respectively. The equation is shown below.

$$C_{upper} = C_{h=\infty} + (\varepsilon_1 - 1)C_{h=h_1}(\varepsilon_2 - \varepsilon_1)C_{h=h_2} \qquad (4)$$

To measure 10% of the full-load torque of the shaft, it is necessary to simulate the loop formed by a 5 pF capacitor and a 1.6 μH inductor. The capacitor may include following parameters. The diameter of the inner sensing inductance coil is 30 mm and the number of coil turns is about 3 to 4. The diameter of the outer sensing inductance coil is 44 mm and the number of coil turns is about 2 to 3. The wires are enameled wires with a diameter of 0.5 mm. The simulation value is calculated using the mathematic software titled MAPLE, which is quite consistent with the measurement results.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A wireless passive strain sensor for measuring a strain of a shaft, comprising:
   an outer coil holder, wherein the shaft penetrates through the outer coil holder;
   a reading inductance coil wrapped around the outer coil holder;
   a capacitance patch disposed on the shaft;
   an inner coil holder disposed in the outer coil holder and mounted on the shaft;
   a bearing structure disposed between the outer coil holder and the inner coil holder; and
   a sensing inductance coil wrapped around the inner coil holder and electrically connected to the capacitance patch.

2. The wireless passive strain sensor according to claim 1, wherein the reading inductance coil is electrically connected to an antenna analyzer.

3. The wireless passive strain sensor according to claim 2, wherein the antenna analyzer is configured to scan a resonance frequency of the reading inductance coil corresponding to the sensing inductance coil.

4. The wireless passive strain sensor according to claim 3, wherein the antenna analyzer is electrically connected to a computer configured to receive the resonance frequency, generate a resonance frequency result according to the resonance frequency, and display the resonance frequency result.

5. The wireless passive strain sensor according to claim 1, wherein the bearing structure comprises a plurality of ball bearings.

6. The wireless passive strain sensor according to claim 5, wherein the plurality of ball bearings are polyoxymethylene (POM) plastic bearings.

7. The wireless passive strain sensor according to claim 1, wherein the capacitance patch is an interdigital capacitor, one end of which is electrically connected to one end of the sensing inductance coil, and the other end of which is electrically connected to the other end of the sensing inductance coil.

8. The wireless passive strain sensor according to claim 1, wherein the capacitance patch is a flexible patch.

9. The wireless passive strain sensor according to claim 1, wherein an included angle between the capacitance patch and the axis of the shaft is 45 degrees.

* * * * *